May 20, 1958  D. O. HARRINGTON ET AL  2,835,162
APPARATUS FOR AND METHOD OF EXAMINING EYES
Filed July 12, 1954  3 Sheets-Sheet 2

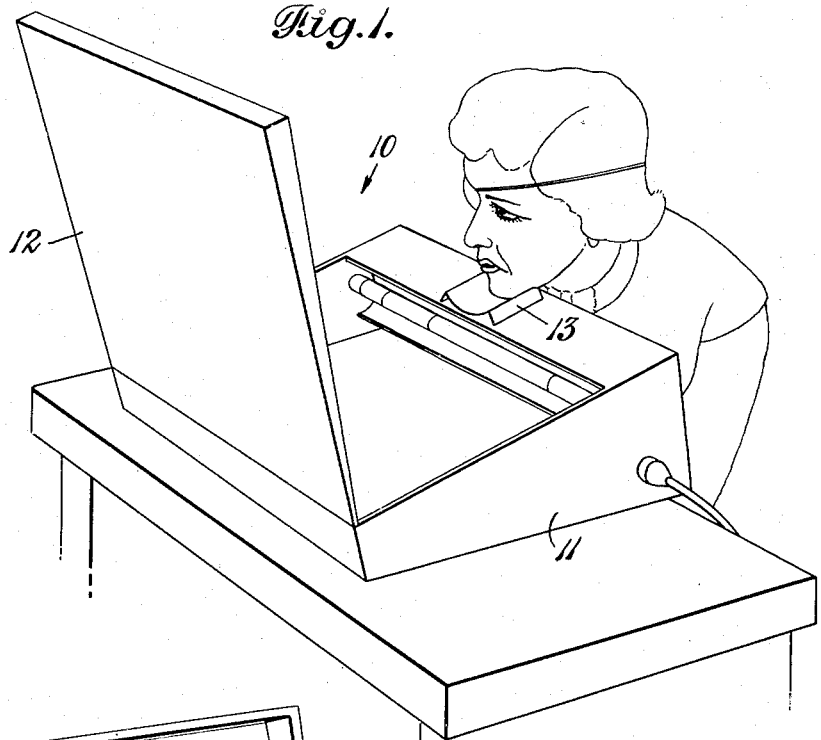
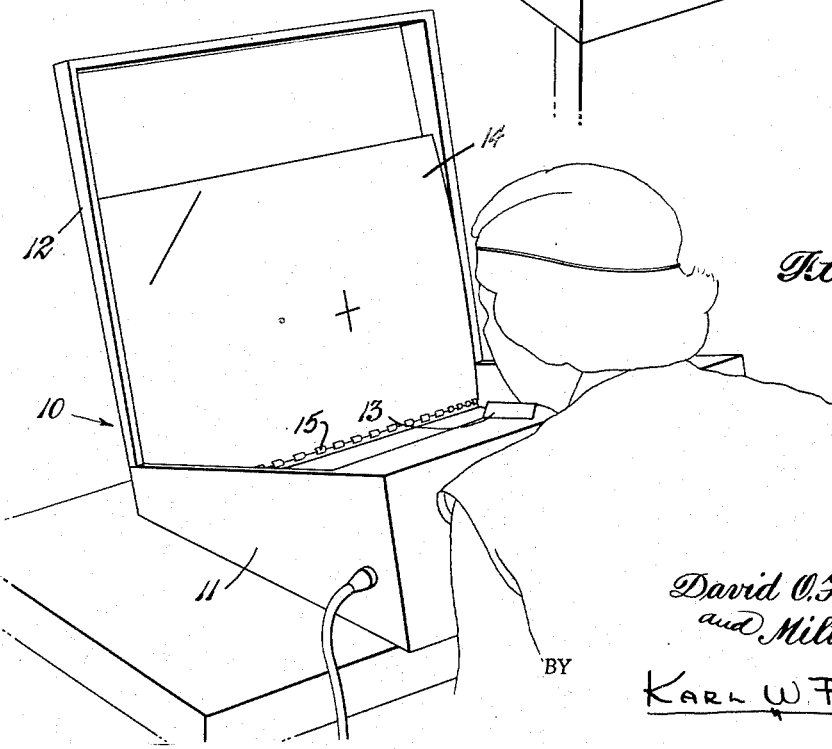

INVENTORS
David O. Harrington
and Milton Flocks
BY Karl W. Flocks
ATTORNEY

INVENTORS
David O. Harrington
and Milton Flocks
BY Karl W. Flocks
ATTORNEY

United States Patent Office 2,835,162
Patented May 20, 1958

2,835,162

APPARATUS FOR AND METHOD OF EXAMINING EYES

David O. Harrington and Milton Flocks, San Francisco, Calif.

Application July 12, 1954, Serial No. 442,754

15 Claims. (Cl. 88—20)

This invention relates to an apparatus and method of examining the human eye and more particularly to an apparatus and method for examining the visual field of the eye.

The field of vision has been defined as that portion of space in which objects are visible at the same moment during steady fixation of the gaze in one direction. By means of the examination of the visual field, diseases of the eye, the central nervous system and of other parts of the body may first be detected. Early detection of visual field defects is important, for many of these diseases are remedial, and early treatment will frequently be followed by cure or control of the disease process. The extra-foveal field of vision should be differentiated from the visual acuity in that the latter is a measure of the keenness of perception in the center of the entire visual field, whereas the extra-foveal visual field refers to the degree of integrity of vision outside of the fovea. Laymen commonly refer to this as "side vision."

Routine visual field examination of employees in industry, in members of the armed forces and in motor vehicle operators would be of great value if it could be done economically. These examinations are rarely done, however, in the absence of other evidence of eye disease because of the time-consuming nature of the examination and the necessity for an oculist or especially trained technician to perform the examination.

At the present time, the visual field is examined by slowly moving a test object into the field under conditions of constant illumination and recording the places where the test object first appears and disappears. The visual field is usually examined by means of a perimeter or by means of a tangent screen or campimeter. The perimeter consists essentially of an arc of a circle supported on a convenient stand with a chin rest for keeping the eye in the same position throughout the examination and at a distance from the arc corresponding to its radius (330 mm. is usually used). With one of the patient's eyes covered, and the other eye fixed on a white fixation "point" in the center of the arc, the test object, usually a round white object on the end of a long black rod, is introduced along the arc. The patient is asked to signify when he sees the test object and when it disappears. The perimeter arc is rotated to different meridians and the points of appearance of the test object recorded until the limits of the entire field for that size test object have been recorded.

The visual field is also examined using the tangent screen (Bjerrum's screen or campimeter). By this means the central thirty degrees of the field is subjected to closer scrutiny than is done by the perimetric method. The screen usually consists of a square of black cloth two meters square. The fixation object, usually a small white headed pin, is inserted in the center of the vertically placed screen. The patient, with one eye covered, is situated a distance usually of one or two meters from the screen. The test object is then introduced on the screen repeatedly in the various meridians in a manner similar to that used in the perimetric examination.

In addition, the Blind Spot of Mariotte may be plotted using the tangent screen. The blind spot corresponds to the projection in the field of the blind area where the optic nerve enters the eye. In width, it measures approximately 5.5° and in height 7.5°. Its center lies about 15.5° to the lateral side of the fixation point and about 1.5° below the horizontal meridian. Enlargement of the blind spot may indicative of serious eye disease, particularly glaucoma, brain tumor or other central nervous system disease. The blind spot is plotted by putting the test object in the blind area and then bringing it out until seen in the various meridians, marking the limits by black pins on the screen and then measuring the blind spot thus obtained with a rule marked off in degrees.

Throughout the examination of the visual field regardless of the present methods used, the patient's eye must be frequently watched to make sure that he is looking at the fixation point and not the test object. This is particularly true when examining the blind spot for when the test object suddenly disappears there is a natural tendency for the patient to look in that direction. Indeed, in patients with brain tumors and in others with impaired sensoriums, plotting of the blind spots by these methods is sometimes impossible.

Patients who are aware that they have a field defect and do not wish to reveal it to the examiner (as in some special types of pre-employment physical examinations) can frequently fool the examiner by shifting fixation slightly unless the eye is very carefully watched. This is difficult for the examiner must watch not only the eye but the test object.

It is an object of the present invention to provide a method of examining the visual field of the eye which eliminates many of the difficulties heretofore pointed out.

It is a further object of the present invention to provide a method of examining the visual field of the eye which can be effected quickly, easily and be performed by a relatively untrained individual.

It is a still further object of the invention to provide a method of examining the visual field of the eye which eliminates the natural tendency of the patient to glance away from the fixation point to the test object.

These and other objects and the nature and advantages of the instant invention will be apparent from the following description taken in conjunction with the accompanying drawings, wherein:

Fig. 1 is a rear perspective view of the apparatus;

Fig. 2 is a front perspective view of the apparatus;

Figure 3:
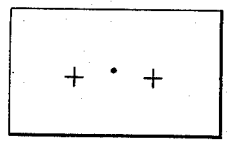
Figs. 3 through 13 are test patterns for use with the apparatus.

Figs. 14 through 19 all relate to the results of actual field tests using the apparatus and method of the present invention.

By means of the present invention, the visual field is examined in the following manner:

The patient, with one eye patched, in a well lighted room sees a white card with a black central fixation dot (at a distance with our present apparatus of 330 mm.). On the card is printed a design in luminescent sulfide which is invisible to the patient except when illuminated with ultraviolet light. The card is illuminated with ultraviolet light for an interval of 0.2 second. The time interval is long enough for the patient to see the pattern but too short for him to shift his fixation. The patient then describes the design seen. A series of other patterns are presented in a similar manner, each one pointed at uncovering a specific type of field defect.

This is a quick and simple method of visual field examination which can be used as part of a visual field screening test or as preliminary to a more detailed perimetric study.

The test patterns, illustrated in Figs. 3 through 13 are preferably printed in white or off-white fluorescent sulfide ink on white or off-white cards using a 5 mm. black dot or spot as the fixation point. In ordinary illumination only the fixation point is visible, the rest of the card appearing plain white or off-white. When the card is exposed to a source of ultraviolet light, the pattern appears as a series of luminous lines or dots against a purple background. Fixation is maintained on the black dot while the card is exposed to the ultraviolet light for 0.2–0.3 second, after which the patient tells what he has seen. The patterns are made extremely simple and may be easily described. Each eye is tested separately with each card. The cards are exposed in the apparatus shown in Figs. 1 and 2. In these figures, 10 represents a box having a base 11 and an upwardly extending portion 12. A chin rest 13 is mounted centrally on the outer edges of the base so that the eye of the patient is about 330 mm. from the fixation spot. The source of ultraviolet light is mounted under the patient's chin and may be equipped with a shutter or equivalent means of controlling the exposure time.

As shown in Fig. 2, a plurality of test cards 14 are shown which are hinged together along their bottom edges by a hinge device 15. The stack of cards is inserted in the upwardly extending portion 12 and is adapted to be flipped downwardly one at a time into the base portion 11, thus exposing successive test cards to the view of the patient.

The examination can be carried out in ordinary room light. There must be sufficient light to enable the patient to fix accurately before exposure of the pattern, such as by means of ultraviolet light. The pattern of Fig. 3 is a test card and is designed to establish the patient's position. Only one cross should be seen with each eye.

Figure 4:
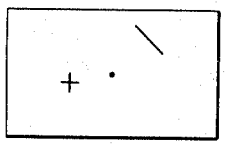
Figure 19:
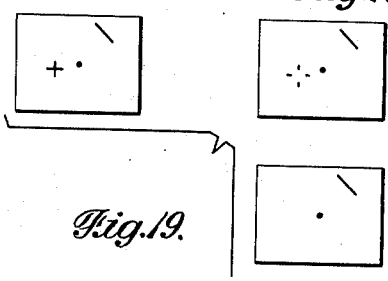

The pattern shown in Fig. 4 is used for testing the location of the Blind Spot of Mariotte with the left eye. This pattern has a cross at this position slightly larger than the normal spot. If the blind spot is not enlarged, the patient will see the edges of the cross as shown in Fig. 19 on the right upper pattern. However, if the blind spot is enlarged as it is in glaucoma or brain tumor, he will see nothing in that area as indicated in Fig. 19 lower right pattern.

Figure 5:
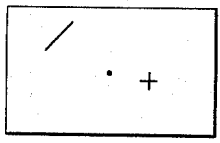

The pattern of Fig. 5 is the reverse of Fig. 4 and is used for testing the right eye.

Figure 6:
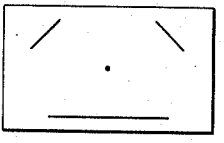
Figure 7:
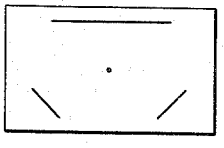

The patterns of Figs. 6 and 7 are abstract designs calculated to detect any visual field loss in the area of the lines. These patterns are useful in connection with lesions of the brain and occasionally in glaucoma.

Figure 8:
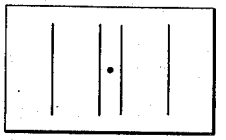

Fig. 8 shows a pattern of four vertical lines, two at 5° and two at 20° from fixation. This pattern is especially useful in detection of hemianopic field defects, either homonymous or bitemporal.

Figure 9:
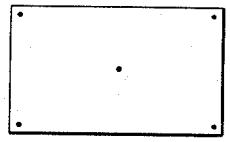
Figure 11:
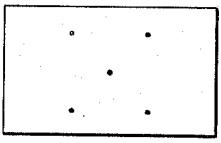
Figure 12:
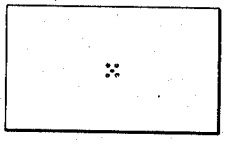

Figs. 9, 11 and 12 show four dots arranged in the four quadrants of the field at various distances from fixation. As illustrated, the dots are located at approximately 25°, 15° and 5°, respectively, from fixation. These patterns are of particular value in binocular testing of hemianopic field defects where extinction is a factor, and is also of value in testing for sector defects from whatever cause.

Figure 10:
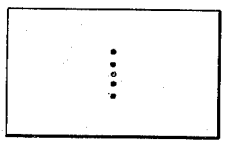

Fig. 10 shows a pattern of four dots, two above and two below fixation at 5° and 10°. This pattern is particularly designed to detect the nerve fiber bundle defect of glaucoma.

Figure 13:
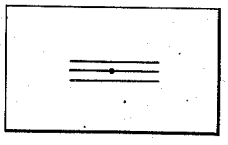

Fig. 13 is likewise useful in testing for glaucoma.

Figs. 14 through 18 are actual examples of the results obtained using the present method and apparatus with persons having various field defects.

Figure 14:
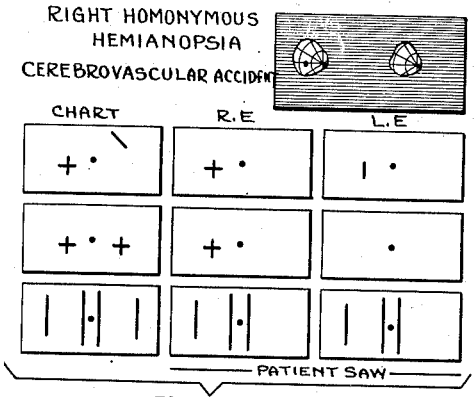

Fig. 14 shows the results using the patterns of Figs. 4, 3 and 8 in testing a patient of age 62. The center column shows what the patient saw with his right eye and the right hand column shows what the patient saw with his left eye. This disclosed a right homonymous hemianopsia from a cerebrovascular accident.

Figure 15:
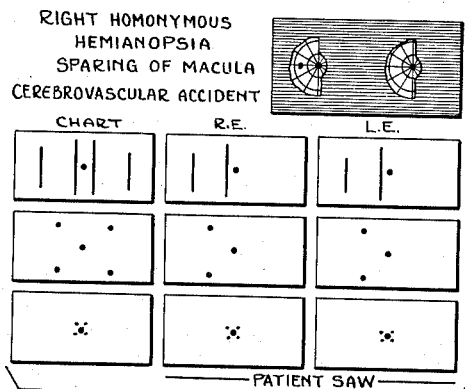

Fig. 15 shows the results in a similar test with a patient of age 60 for the right eye.

Figure 16:
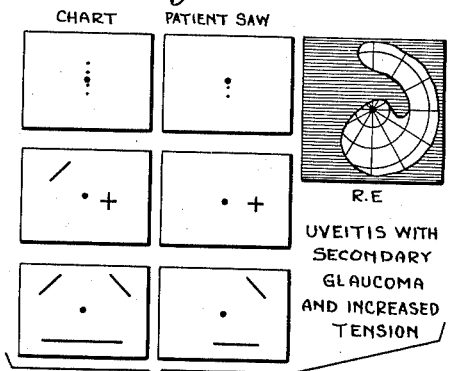

Fig. 16 shows the results in the case of a 75 year old male with uveitis with secondary glaucoma and increased tension using the right eye.

Figure 17:
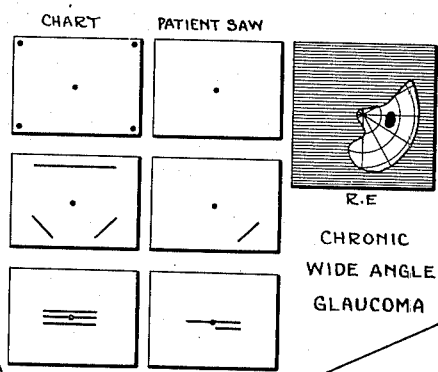

Fig. 17 shows an example of the results with the right eye with chronic wide angle glaucoma.

Figure 18:
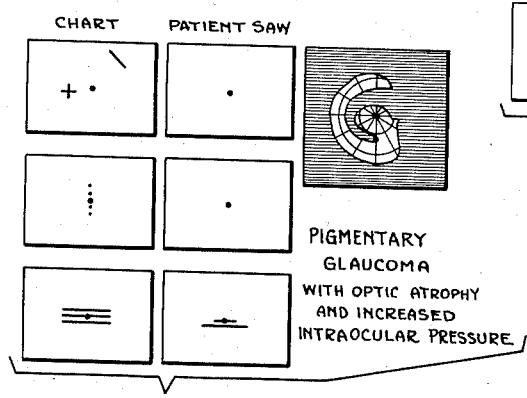

Fig. 18 shows the results with the left eye of a 28 year old male with pigmentary glaucoma with optic atrophy and increased intraocular pressure.

In Figs. 14, 15, 16, 17 and 18, the representation in the upper right-hand corner is the corresponding visual field charted by the ordinary time-consuming tangent screen method using a 2 mm. white test object at a distance of one meter.

In the use of the method in accordance with the invention, successive patterns are momentarily presented to the fixing eye. The patterns may be printed in white fluorescent sulfide ink on white cards so that only the central fixation dot is visible. When the card is illuminated by a flash of ultraviolet radiation of about ¼ second duration, the pattern stands out clearly. The duration of the flash is sufficient to allow the subject to see the pattern but too short to allow a shift of fixation. Each pattern is designed to test specific areas of the visual field so that any errors in describing the pattern delineate the type of field loss which may then be examined by standard perimetric methods.

This multiple pattern method is simple in concept, uses inexpensive portable equipment, and can be used by untrained laymen. It requires only a few moments to perform and quickly detects a high percentage of visual field defects.

This method can be used primarily as a screening device to be applied to mass surveys of extra-foveal vision. It lends itself well to motor vehicle driver tests, in the armed services, testing visual function in industry, in institutional examinations as in schools, and in mass surveys of the population for glaucoma and other serious diseases of the visual apparatus.

Although the invention has been described with test cards printed with fluorescent sulfide ink that can be made visible by ultraviolet light, it should be understood that other inks and other types of light can be used, or the patterns can be flashed in any other feasible manner including projection means. The requirement is that the pattern be made visible only momentarily to prevent the patient from shifting his fixation from the continuously visible fixation point.

It will be obvious to those skilled in the art that various changes may be made without departing from the spirit of the invention and therefore the invention is not limited to what is shown in the drawings and described in the specifications but only as indicated in the appended claims.

What is claimed is:

1. A method of testing for defects in the visual field of the eye which comprises constantly presenting a fixation point located a predetermined distance from the eye, presenting individually and successively a plurality of different patterns to the eye to determine how much is seen of each pattern, each pattern being completely presented for a fraction of a second while the eye is fixed on the fixation point, said pattern comprising a plurality of unconnected markings laterally spaced from the fixation point in more than one quadrant of the field of vision and being specifically designed to be partially invisible to an eye having a visual field defect therein in the quadrants in which the markings appear when the eye is fixed on the fixation point said successive patterns differing from one another in their relative locations and distances from the fixation point whereby any defect in the field of vision of the eye can be determined by said plurality of patterns.

2. A method of testing for defects in the visual field of the eye which comprises constantly presenting a visible fixation point a predetermined distance from the eye, flashing a pattern momentarily in the field of vision whereby the patient has not time to shift his fixation after the new stimulus is introduced and before it has disappeared again, determining how much of the pattern is seen by the patient, said pattern being of such a configuration as to be partially invisible to an eye having a visual field defect therein when the eye is fixed on the fixation point, said pattern comprising a plurality of unconnected markings laterally spaced from the fixation point in more than one quadrant of the field of vision and being specifically designed to disclose a defect in a particular portion of the field of vision, flashing a second pattern different from said first pattern momentarily in the field of vision while said fixation point is still constantly visible, determining how much of said second pattern is seen by the patient, said second pattern comprising a plurality of unconnected markings laterally spaced from the fixation point in more than one quadrant of the field of vision and continuing to flash additional different patterns having markings in different locations at varying distances from the fixation point and determining the reaction of the eye of the patient to each pattern whereby any defect in the field of vision of the eye can be determined by said set of patterns.

3. Apparatus for testing for defects in the visual field of the eye which comprises a series of different testing targets, each said target comprising a constantly visible fixation point and a plurality of substantially invisible unconnected markings laterally spaced from the fixation point in more than one quadrant of the field of vision, each target being specifically designed to disclose a visual field defect in the quadrants in which the markings appear, and means for rendering the invisible markings on each target visible for a fraction of a second, the duration of visibility being such that insufficient time is allowed for the patient to shift his fixation from said fixation point.

4. Apparatus in accordance with claim 3 wherein said markings are selecetd from the group consisting of lines, dots and crosses.

5. Apparatus in accordance with claim 3 wherein the invisible markings on said series of testing targets are so arranged that when all of said markings are plotted on a single target, said markings are located in all four quadrants with respect to said fixation point.

6. Apparatus in accordance with claim 3 wherein the invisible markings on said series of testing targets are located in the central field of vision displaced in the range of from approximately 5° to 25° from the fixation point in each quadrant.

7. Apparatus for testing for defects in the visual field of the eye which comprises a series of different patterns, each pattern consisting of a constantly visible fixation point at the center thereof and a plurality of normally invisible unconnected markings, said markings being laterally spaced from the fixation point in more than one quadrant of the field of vision, each pattern being adapted to detect a defect in the visual field of the eye in the quadrants in which the markings are located, and means for making said markings visible for a fraction of a second, said markings when rendered visible being partially invisible to an eye having a visual field defect therein in the area of the visual field corresponding to the markings.

8. A portable apparatus for testing for defects in the visual field of the eye which comprises a container having a cover extending upwardly therefrom, a plurality of test cards adapted to be mounted one at a time on said cover, each test card containing a pattern thereon adapted to detect a specific defect in the visual field of the eye, each test card having a constantly visible fixation point at the center thereof, each said pattern comprising a plurality of marks outside the fixation area that are invisible in ordinary light but are capable of being rendered visible, said marks being laterally spaced from the fixation point in more than one quadrant of the field of vision, and means for rendering said patterns momentarily visible, said marks when rendered visible to the eye being tested being partially invisible to an eye having a visual field defect therein in the area of the visual field corresponding to that pattern.

9. Apparatus for testing the eye for defects in the Blind Spot of Mariotte which comprises a test card spaced a given viewing distance from the eye to be tested, said test card having a constantly visible fixation point at the center thereof and a normally invisible plurality of markings spaced laterally therefrom, said markings comprising a cross laterally spaced from said fixation point located at an area corresponding to the location of said blind spot during fixation on said point from the given viewing distance, said cross covering a larger portion of the field at the particular viewing distance than that part of the field subtended by the blind spot of a normal eye, and a second marking in the quadrant of the card opposite to said cross, and means for momentarily making the normally invisible markings visible, the duration of visibility being such that insufficient time is allowed for the patient to shift his fixation from said fixation point to said markings, whereby defects in the size of said blind spot may be determined.

10. A set of test cards for use in testing for defects in the visual field of the eye which comprises a plurality of cards, each card having a fixation point marked thereon which is constantly visible and a plurality of unconnected normally invisible markings thereon laterally spaced from said fixation point in more than one quadrant of the field of vision, each said invisible plurality of markings being different from each other plurality of markings by their relative locations and distances from the fixation point and being of such a configuration that they are adapted to detect a defect in the visual field of the eye in the quadrants in which the markings are located, said markings being capable of being made visible when desired, whereby when an eye is tested with said set of cards any defect in the field of vision of the eye can be determined by said plurality of patterns.

11. A set of test cards in accordance with claim 10 wherein a hinge means is provided for hinging said cards together along a common hinge line whereby each card in said set can be readily individually and successively pivoted out of view of the eye being tested.

12. A set of test cards in accordance with claim 10 wherein means are provided for mounting said set of cards in a stack so that the top card is in view of the eye to be tested and so that successive cards can be moved successively from the original stack to form a similar stack in a second position out of the view of the eye being tested.

13. A set of test cards in accordance with claim 10 wherein said markings are selected from the group consisting of lines, dots and crosses.

14. A set of test cards in accordance with claim 10 wherein the invisible markings on said cards are so arranged that when all of said markings are plotted on a single card, said markings are located in all four quadrants with respect to said fixation point.

15. A set of test cards in accordance with claim 10 wherein the invisible markings on said cards are located in the central field of vision displaced in the range of from approximately 5° to 25° from the fixation point in each quadrant.

(References on following page)

References Cited in the file of this patent

UNITED STATES PATENTS

| | | |
|---|---|---|
| 1,004,503 | Troy | Sept. 26, 1911 |
| 1,412,902 | Tallman | Apr. 18, 1922 |
| 1,880,028 | Tillyer et al. | Sept. 27, 1932 |
| 1,903,502 | Campbell | Apr. 11, 1933 |
| 1,981,587 | Dorsey | Nov. 20, 1934 |
| 2,406,596 | Ellis | Aug. 27, 1946 |
| 2,430,232 | Lynch | Nov. 4, 1947 |
| 2,551,683 | Levy | May 8, 1951 |
| 2,564,794 | Shekels | Aug. 21, 1951 |
| 2,744,441 | Cox | May 8, 1956 |

OTHER REFERENCES

Feldman et al.: article in Archives of Ophthalmology, vol. 36, November 1946, pages 537 to 539.

Zugsmith article in American Journal of Opthalmology, vol. 32, November 1949, pages 1573 to 1576.